United States Patent [19]

Dickinson

[11] 4,098,145

[45] Jul. 4, 1978

[54] TRACTION-DRIVE TRANSMISSION

[75] Inventor: Thorn W. Dickinson, Berlin, Conn.

[73] Assignee: Textron Inc., Providence, R.I.

[21] Appl. No.: 723,603

[22] Filed: Sep. 15, 1976

Related U.S. Application Data

[63] Continuation of Ser. No. 614,606, Sep. 18, 1975, abandoned.

[51] Int. Cl.² .................... F16H 37/06; F16H 15/16
[52] U.S. Cl. ........................................ 74/690; 74/191
[58] Field of Search ............... 74/690, 691, 190, 191, 74/192, 193, 194, 793, 796

[56] References Cited

U.S. PATENT DOCUMENTS

| | | | |
|---|---|---|---|
| 1,058,981 | 4/1913 | Jensen et al. | 74/193 |
| 2,560,180 | 7/1951 | Lesueur | 74/191 |
| 2,818,751 | 1/1958 | Jorgensen | 74/690 |
| 2,883,883 | 4/1959 | Chillson | 74/690 |
| 3,203,278 | 8/1965 | General | 74/690 |
| 3,299,743 | 1/1967 | Stockton | 74/690 |
| 3,365,982 | 1/1968 | Floyd | 74/690 |
| 3,633,430 | 1/1972 | Bentley | 74/690 |
| 3,695,120 | 10/1972 | Titt | 74/690 |
| 3,793,910 | 2/1974 | Nasvytis | 74/690 X |

Primary Examiner—Allan D. Herrmann
Assistant Examiner—Lance W. Chandler
Attorney, Agent, or Firm—Hopgood, Calimafde, Kalil, Blaustein & Lieberman

[57] ABSTRACT

The invention contemplates an improved mechanical traction drive providing a single control whereby a desired range of speed ratios between input and output shafts is selectively available, without requiring clutch connection to the power source, such as an internal-combustion engine. The transmission involves a combination of completely mechanical friction-roller and meshing-gear planetary systems which are connected at all times, whether the single control is operated to call for a forward drive, a stop or a reverse drive of the output shaft. For the particular disclosed form, provision is made for automatic downshifting reaction to increasing load, and major axial-reaction forces are self-contained by rotating mechanism, thus (a) avoiding substantial axial force components on main-bearings of the mechanism, and (b) reducing to very small magnitudes the requisite force for selective control actuation.

28 Claims, 11 Drawing Figures

TRACTION-DRIVE TRANSMISSION

This application is a continuation of my copending application, Ser. No. 614,606, filed Sept. 18, 1975, now abandoned.

This invention relates to mechanical traction drives and in particular to those involving planetary systems of rolling and gear elements.

Structures of the character indicated which have thus far been proposed have suffered from such mechanical complexity as to render them uncompetitive with more conventional (e.g., clutch-operated) transmissions. They suffer from excessive parts wear and heat development and are, in general, inadequate to the task of driving such relatively small vehicles as golf carts, garden tractors, snow plows and the like.

It is a general object of the invention to provide an improved mechanical traction drive of the character indicated offering technical and economic advantages with respect to the conventional drives of today.

A specific object is to provide an improved clutch-free traction drive, particularly for relatively small vehicles, such as golf carts, garden tractors, snow plows, and the like.

Another specific object is to meet the above objects with a planetary system utilizing but a single control actuator to selectively determine a given speed within an infinite range which includes forward drive, stop and reverse drive of the vehicle, without changing the running condition of the drive motor or engine for the vehicle.

It is a further specific object to provide an improved transmission utilizing a traction-roller planetary system wherein automatic overload protection is afforded by "downshift" of the drive ratio, all within a predetermined limiting condition, such as 90 percent for the coefficient of traction for the rolling elements, thereby avoiding "gross skid" assuring rolling-contact action at all times.

Still another specific object is to provide such a transmission wherein the parts are balanced and spring loaded to minimize shift-control force, particularly for speeds near "neutral," meaning zero or substantially zero output speed, without disturbing the continuously connected and running conditions of transmission parts.

A further specific object is to provide an improved planetary traction-roller drive wherein planetary wheels are self-stabilizing for axis-parallelism with respect to a central drive axis.

Another specific object is to provide a transmission meeting the above objects and essentially confining the moving parts to a single subassembly, which is bodily removable from the transmission housing for ready service and repair.

A general object is to meet the above objects with basically simple mechanism, of relatively great mechanical effectiveness, and of such low cost as to be competitive with conventional transmissions of lesser technical capability.

Other objects and various further features of the invention will be pointed out or will occur to those skilled in the art from a reading of the following specification in conjunction with the accompanying drawings. In said drawings, which show, for illustrative purposes only, a preferred form of the invention:

FIG. 3 is an exploded view in perspective, to show the planet-member carrier of my transmission;

Figure 1:
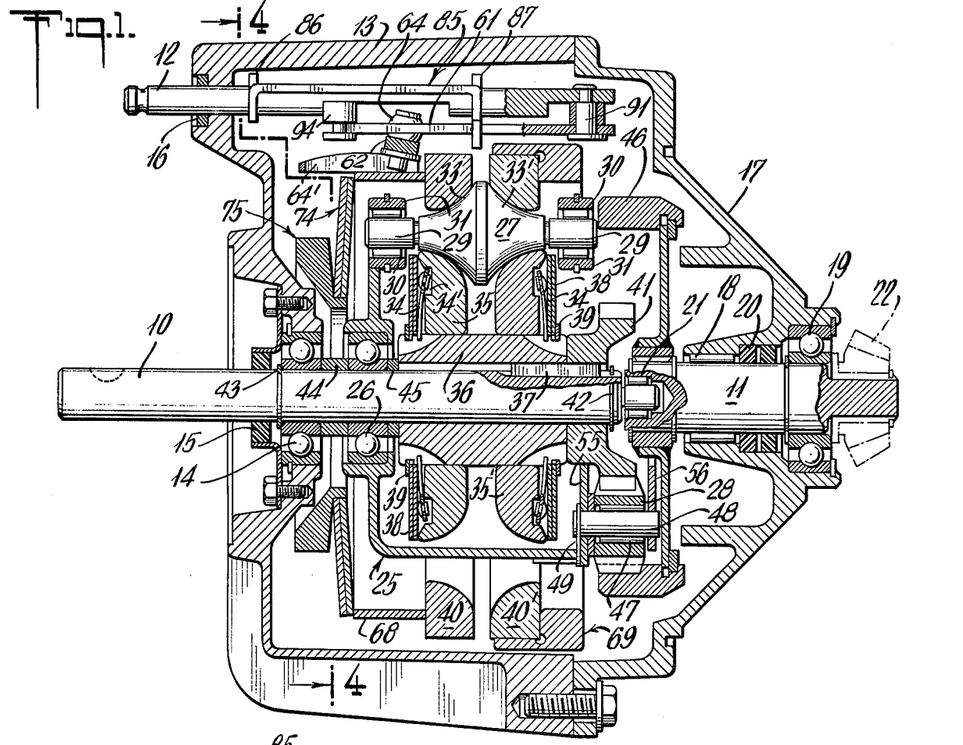
FIG. 1 is a longitudinal sectional view through a traction-drive transmission of the invention.

Referring initially to FIG. 1, the traction drive of the invention accepts continuous input rotation of a drive shaft 10 (as from an internal-combustion engine, not shown) and converts the same to forward drive, "neutral" (stop), or reverse drive of an output shaft 11, all in accordance with the selective longitudinal positioning of a single control-rod element 12. The transmission will be described in the context of illustrative use on a small vehicle such as a lawn or garden tractor for which the engine may be in the range of 10 to 20 horsepower, but the principles of the invention will be understood to be of greater range of application. And remote actuation of control element 12 will depend upon particular application convenience, with connection to the outwardly exposed end of element 12.

The transmission is contained in a relatively small cupshaped housing body 13, in the closed end of which the input shaft 10 is supported by an antifriction bearing 14 and is suitably sealed by means 15. The control element 12 is slidably supported through and sealed at 16 to an upper part of the closed end of body 13. The housing is closed by a removable end bell 17 having a central hub in which the output shaft 11 is shown supported by spaced needle and ball bearings 18–19 and is suitable sealed at 20. Shafts 10–11 include telescoping ends, with interposed needle-bearing means 21; and a load is symbolized by an output bevel gear 22.

THE PLANETARY SYSTEMS

Within the housing 13, and as part of a complete subassembly carried by the input shaft 10, a single planet-element carrier 25 is rotatably mounted by bearing means 26 on shaft 10; the carrier 25 angularly positions and carries plural planet rollers or wheels 27 and plural planet gears 28 in equal angularly spaced interlaced relation, thereby interconnecting traction-roller and meshing-gear planetary systems, to be described. Preferably, there are three planet rollers 27 and three planet gears 28. Each roller 27 has projecting rotary-support ends 29 riding in needle bearings 30 in slide members 31, and members 31 are in turn guided by radial guide slots 32 in the carrier 25, to be more fully described in connectiion with FIG. 3.

Each planet roller 27 is a single rigid element characterized by two like rolling-contact surfaces 33–33+ which are truncated-toroidal and concave; surfaces 33-33' are sloped in generally axially-opposite and radially outward orientation, and the surfaces 33-33' may each be the surface of revolution of a circular arc, about an exis outside the circle from which the arc is taken.

The traction-roller planetary system comprises two like sun wheels 35-35' mounted for independent and keyed axial sliding upon a drive sleeve 36, keyed at 37 to the input shaft 10; coupling means in the form of an axially flexible and torsionally stiff plate 34 (see also FIGS. 8 and 9) is shown as the means of establishing a keying connection from sleeve 36 to local key recessed 34' in the sun wheels 35-35'. The outer surfaces of wheels 35-35' are convex and of opposed slope orientation, each being preferably the surface of revolution of a circular arc, of radius less than that of the circular arc defining the respective planet surfaces 33-33'. Opposed Belleville washers or springs 38 are retained on sleeve 36 by snap rings 39 to establish a predetermined axially squeezing preload force of sun wheels 35-35' against the respective planet surfaces 33-33', thus applying a radially outward force which tends to outwardly displace the planet rollers 27. This displacement and force are opposed by similar axially inward squeezing force applied to two reaction rings 40-40', having antirotational support in housing 13. Such support and the control and variation of squeezing force action upon reaction rings 40-40', will be the subject of later and more detailed discussion, in connection with control by rod 12 and by load-responsive downshift mechanism. It suffices here to note that the inwardly facing rolling-contact surfaces of reaction rings 40-40' may, like those of sun wheels 35-35', each be defined as a surface of revolution of a circular arc of radius less than that of the circular arc defining the plural planet surfaces 33-33'.

Figure 2:
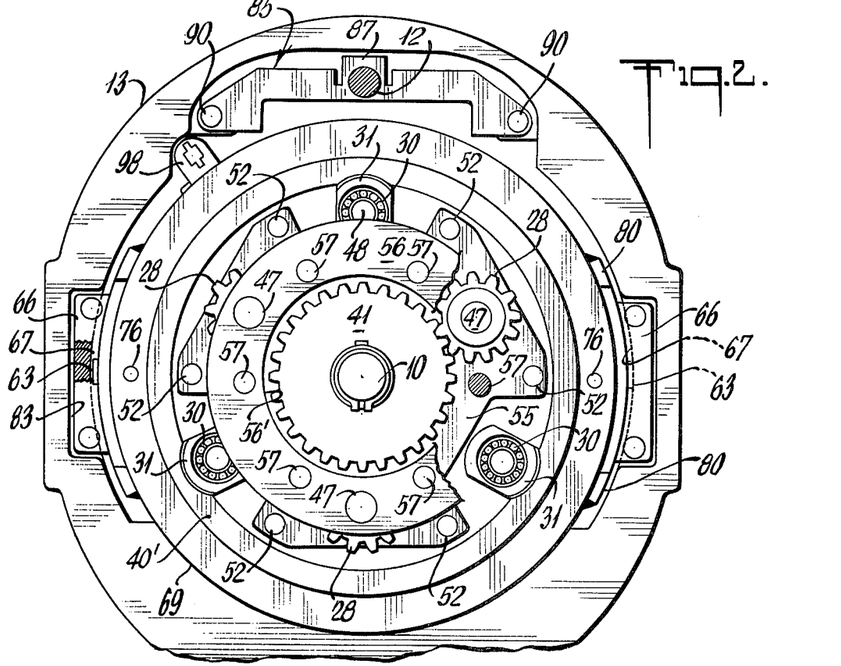
FIG. 2 is a right-end view of the mechanism of FIG. 1, after its right-end cover and output subassembly have been removed.

The meshing-gear planetary system comprises a drive or sun gear 41, keyed at 37 to shaft 10 and axially retained by and between snap rings 42-43, along with sleeve 36, the inner rings of bearings 14-26, and axial spacers 44-45 as appropriate. Gear 41 is in constant mesh with the planet gears 28, and the latter are in constant mesh with the inwardly facing teeth of a ring gear 46 that is keyed to the output shaft. Each planet gear 28 is seen in FIGS. 1, 2 and 3 to be needle-bearing mounted at 47 to a support pin 48 that is fixedly retained by means 49 to part of the carrier structure 25.

The carrier 25 is seen in FIG. 3 to be essentially an assembly of a planet-rolling retainer casting 50 and a planet-gear cage subassembly 51, bolted together by means 52. Basically, the casting 50 is a continuous plate-like ring at its bearing-supported end 53, and formed with integral arcuate angular segments 54 which extend axially and which are angularly spaced as needed for planet-roller clearance at the respective radially slotted guide locations 32. The planet-gear cage subassembly 51 comprises annular plates 55-56, axially spaced and retained by spacing rivets 57. The plate 55 has three lobe-like projections to enable securely bolted fastening of these projections to the respective body segments 54; the plate 56 is circular and suitably bored at angularly spaced locations for support of the three planet-gear pins 47. As best seen in FIG. 2, the aligned central openings 55'-56' of plates 55-56 clear the teeth of gear 41.

ANTIROTATIONAL SUPPORT AND SQUEEZE CONTROL OF REACTION RINGS 40-41'

Figure 4:
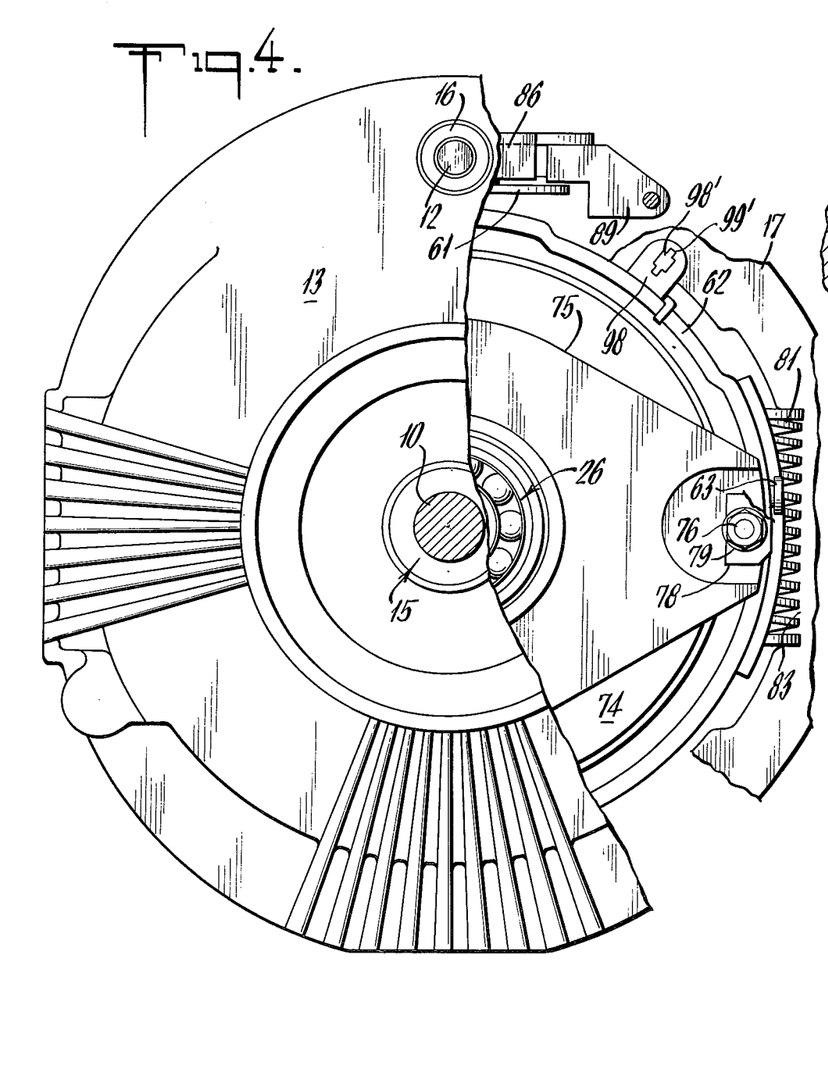
FIG. 4 is a left-end view of the mechanism of FIG. 1, with the housing partly broken-away to reveal control parts.
Figure 5:
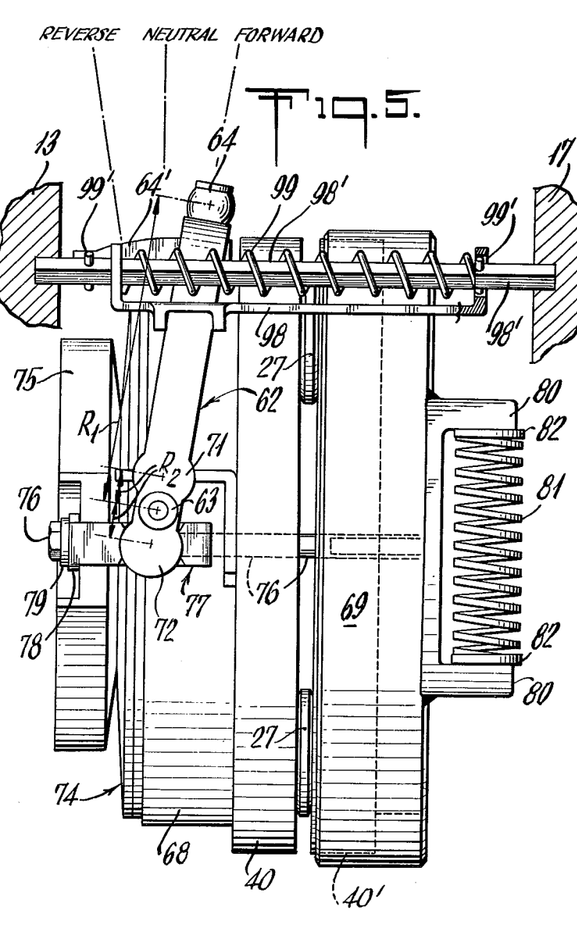
FIG. 5 is a view in side elevation, to show control parts.
Figures 6, 7:
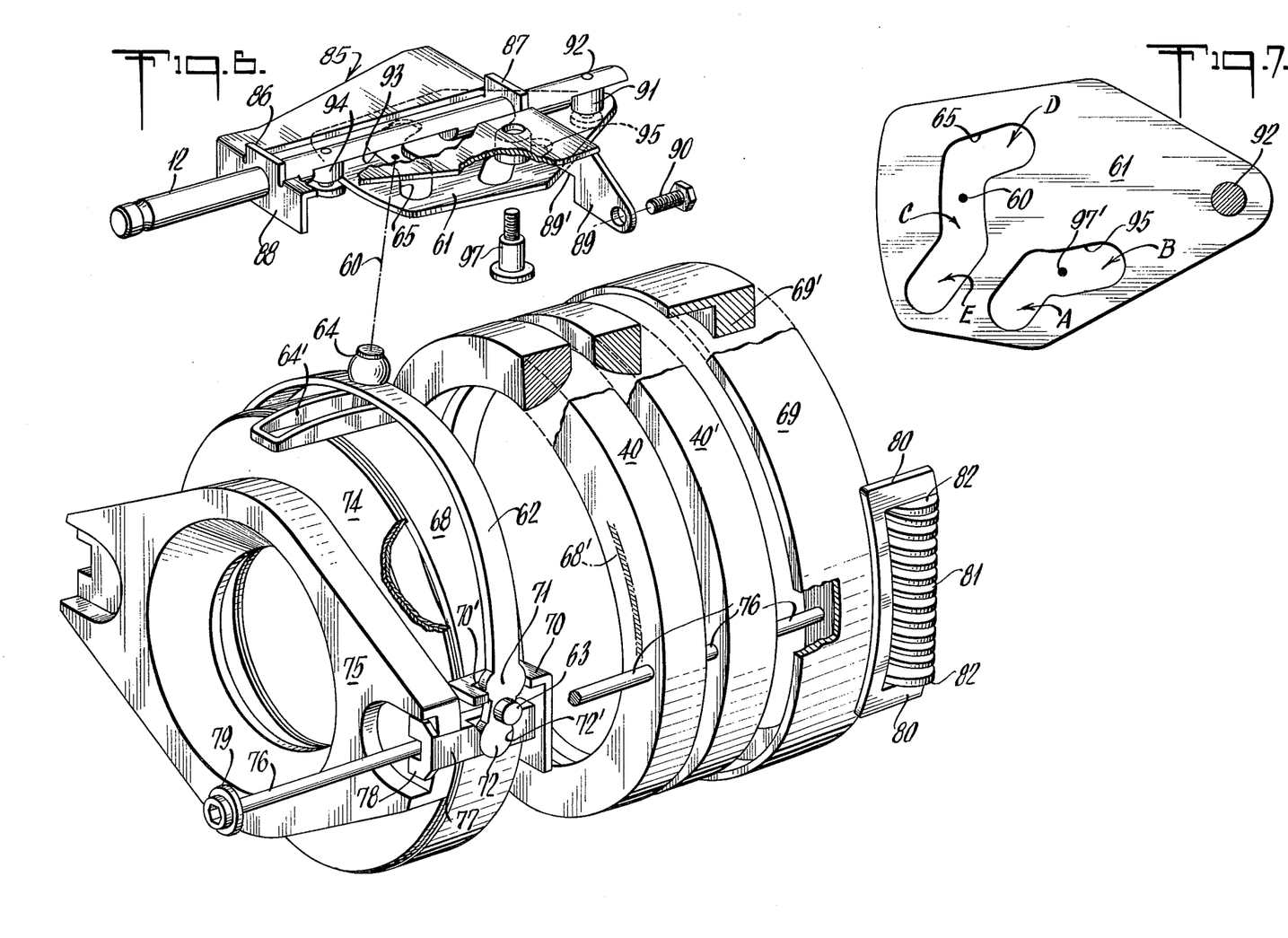
FIG. 6 is an exploded view in perspective of load-responsive shift-control mechanism of FIG. 1, partly broken-away to reveal an overall parts relationship.
FIG. 7 is a plan view of a cam plate in the shift-control mechanism.
Figure 7:
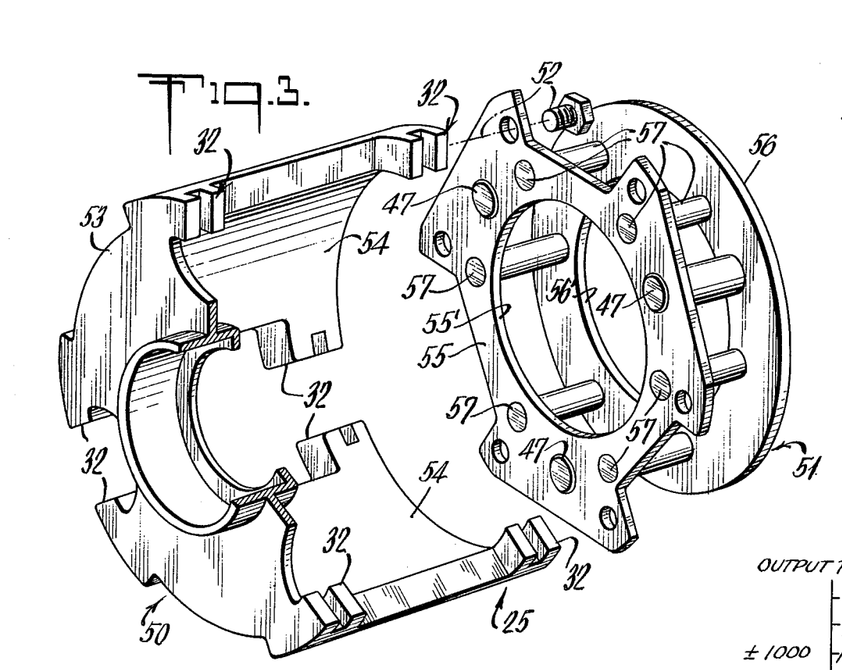

Primary reference is made to FIGS. 4, 5 and 6 in describing mechanism whereby torsionally reactive antirotational support is provided for the reaction rings 40-40' and whereby a selectively applied control positioning of the shift rod 12 is subject to automatic load-responsive correction. Basically, the mechanism comprises (A) a torsionally resilient suspension of an axially preloaded squeezing subassembly, shown in exploded array in the lower part of FIG. 6, and (B) cam-operated means referenced to the housing and associated with shift rod 12, shown as a subassembly in exploded offset (on the alignment 60) from the squeezing subassembly. The shift axis of rod 12 is parallel to the central axis of the planetary systems (i.e., to the axis of reaction rings 40-40'); and selected positioning of rod 12 is translated, via cam means 61 and a cam-following aracuate yoke 62 having pivoted reference at 63 to an axially fixed location in the housing, into corresponding changes in squeeze action. The yoke-pivot roll 63 is one of two, at substantially diametrically opposed locations on the respective arms of yoke 62, and a cam-follower roll 64 at the midpoint of yoke 62 tracks shift-rod position via a first cam slot 65 in means 61. A stabilizing channel 64' forms part of the sleeve 68, establishing an axially extending groove to guide the radially inward projecting end of the pin which mounts cam-follower roll 64, and the outer arcuate longitudinal profile of the walls of channel 64' lends torsional stability to the cam-follower region in the course of yoke pivoting about the axis of means 63. The frame reference for yoke pivots 63 will be seen in FIG. 2 to be provided by like diametrically opposed blocks 66, secured to housing 13, and each having an arcuate guide channel 67 in which the yoke pivot 63 is axially captive with a limited freedom for arcuate displacement.

The squeezing subassembly comprises spaced outer sleeve members 68-69 in axial abutment with the respective reaction rings 40-40'; the radius at which sleeve 68 thus abuts reaction ring 40 is suggested by shading between spaced arcuate phantom lines at 68' in FIG. 6, while the other reaction ring 40' is seated within a locating skirt and against a body portion 69' of sleeve 69. Sleeve member 68 includes spaced brackets 70, recessed at 70', to engage and track the instantaneous axial position of a first crank region 71 of each of the yoke arms, while a second crank region 72 of each of the yoke arms is use for similar axial-position tracking by the other sleeve member 69. Since regions 71-72 are on opposite sides of the axis of yoke-pivot means 63, the axial displacements of sleeves 68-69 are equal and opposite, in response to yoke actuation. Stiffly compliant Belleville-spring means 74 is relied upon to apply a squeezing preload of sleeves 68-69 upon rings 40-40'; as shown, the outer radial limit of spring means 74 acts (to the right, in the sense of FIGS. 1, 5 an 6) on sleeve 68, while a diametrically extending beam 75 received equal and opposite action from the inner limit of spring means 74. Two tie rods 76 connect diametrically opposite ends of beam 75 to correspondingly diametrically opposite locations on the sleeve body 69', so that spring action on beam 75 is directly translated into spring action (to the left, in the sense of FIGS. 1, 5 and 6) upon sleeve 69. Each connection of a tie rod 76 to an end of beam 75 is seen in FIG. 6 to involve a tie-rod guide member 77 which comprises a longitudinal channel to receive and locate the associated tie rod 76, the channel body being in turn located in an outwardly slotted end of beam 75; flanges or ears 78 on each member 77 bear against beam 75 at the edges of each end slot thereof, and a washer 79 beneath the head of each tie rod 76 seats against the flanges 78 of the adjacent guide member 77. Finally, a local recess 72' at a longitudinally central region of each guide member 77 coacts with yoke region 72 to respond to a shifted displacement of follower 64.

From the foregoing description of the squeezing subassembly it will be understood that the instantaneous axial spacing of outer rings 40-40' is always and solely a function of the instantaneous angular position of yoke 62 about its pivot means 63. The force with which such spacing (of rings 40-40') is held will be that which is needed to achieve equilibrium with the instantaneous radially outward displacement force of planet rollers 27. The relatively great mechanical advantage attributable to the predominance of follower-crank radius $R_1$ over actuation-crank radii $R_2$ (see FIG. 5) means a correspondingly reduced reaction force as viewed along the displacement axis of control rod 12, but I prefer to select the force characteristic of spring means 74 so as to provide a "preload" force in such opposition to the radially outward displacement force of planet rollers 27 that a nominal or "neutral" position of yoke 62 is naturally retained. Thus, any adjusted shift of rod 12 from its "neutral" position will only involve differential actuation of the respective ends of the squeezing subassembly, so that control-force magnitudes can be kept at relatively very low levels, involving minimum reaction upon the housing or upon the control mechanism.

A description of the squeezing subassembly is completed by noting that both tie rods 76 pass through aligned locating apertures in each of the reaction rings 40-40' and in the radial-plane wall of each of the brackets 70, thus assuring angularly keyed integrity of all parts of the subassembly. Additionally, the sleeve 69 is provided with diametrically opposed pairs of angularly spaced arms 80; between each pair of arms 80, a compressionally preloaded spring 81 is seated on pads or washers 82. A substantial fraction of each pad 82 projects radially outside arms 80 for torsionally resilient reacting engagement with adjacent side-wall regions of diametrically opposed local recesses 83 in housing member 17; these recesses may be seen in FIG. 4, but springs 81 have been omitted from FIG. 2 in order to permit viewing identification of the guide blocks 66 for yoke-pivot action (already described).

The upper and non-rotatable control subassembly of FIG. 6 will be seen to comprise a trapezoidal bracket 85 of formed sheet metal and establishing guides for rod 12 at spaced upstanding projections 86-87, the latter being part of stiffening end flanges 88-89, respectively. The outer ends of flange 89 are enlarged, to permit secure bolting, by means 90, to the interior of housing 13 (see also FIG. 2); the intermediate portion of the lower edge of flange 89 is relieved (at 89') for closely nested accommodation of the plate which constitutes the cam means 61. At its axially inner end, rod 12 is relieved to establish a flat diametrically extending surface for stabilized seating of a bushing 91, for suitably spacing the pivotal connection of cam plate 61 to rod 12, at pin 92. A central region 93 of rod 12 is similarly relieved, to enable working clearance with cam follower 64 and to enable rivet-mounting of a grooved pin 94 for guided support of plate 61 throughout its range of pivoted action. As best seen in FIG. 7, plate 61 includes first (64) and second (95) cam slots; a first roller pin 97 is secured to bracket 85 and is in constant tracking engagement with the cam 95, and the cam-follower roll 64 is in constant tracking engagement with the cam 65.

It will be understood that an axial shifting of rod 12 will cause pin 97, through reaction with cam 95, to pivotally displace cam plate 61, about the axis of pin 92. Such displacement of plate 61 will change the instantaneous location of cam-follower (64) engagement along cam 65, and at the same time plate 61 will have been longitudinally displaced in unison with rod 12, thereby imparting a rotational displacement of yoke 62 about its pivot means 63, and thus directly changing the axial spacing and, therefore the squeezing action of reaction rings 40-40', as well as the preloaded condition of spring means 74.

In FIG. 7, cam 95 is seen to comprise two end courses A-B of a dog-leg profile, and cam 65 is seen to comprise a central stretch C of constant radius about the pivot 62 and divergent end courses D-E to constitute an overall zig-zag profile. The significance of these courses will more fully appear later, in the course of a description of operation of my transmission. Suffice it now to indicate that, for any given control-rod (12) selection of longitudinal position for plate 61, there will be a corresponding angular setting thereof (about pivot 92), through pin (97) reaction with cam 95; also, for any given load-torque reaction sufficient to involve further-compressing displacement of springs 81, the position of follower 64 will have been correspondingly advanced along cam 65, to the extent of entering one of the end courses D-E, depending upon the direction of such torque reaction.

THE BELLEVILLE SPRINGS AND THEIR LOADING

As already noted, each positional adjustment of the spacing of reaction wheels 40-40' is accompanied by a positional shift of the planet rollers 27, in radial direction and extent, against the compressional preload of the sun wheels 35-35' (due to the combined effect of springs 38). The spring means 74 merely relieves the net force encountered at control rod 12; the characteristic and preload level of spring means 74 are selected to substantially match or offset the instantaneous axial-force reaction from the preloading springs 38. In terms of control-rod (12) positioning, the net traction-drive ratio will always depend primarily upon (a) the current positional setting of control rod 12 and (b) such corrective modification of the pivoted angle of yoke 62 as is achieved for such setting by reason of load-reacting influence upon the antirotational springs 81 and the cam means 65-64. For the present illustration in which forward, stop ("neutral") and reverse drives are selectively available, such availability of "neutral" (zero output speed) applies under load as well as under no-load conditions; the control-rod position necessary to achieve "neutral" will always be the same, but the cam follower 64 will assume various positions in the central region C of cam 65, depending upon the load condition. In any event, however, the above-noted spring reaction, between inner-spring means 38 and the balancing or offsetting effect of the outer-spring means 74, will always be operative upon the mechanism, and FIG. 10 is intended to assist in an appreciation of this point.

First, however, I shall state a preference for the use of so called Belleville springs at 38-74 because they have the property of exhibiting a negative-rate coefficient for axial deflections beyond that deflection at which their positive-rate coefficient ends. This positive-negative character of the Belleville spring coefficient applied to such springs as are merely dished (frusto-conical) washers, as well as to such springs which are additionally characterized by radially slotted or other special features. Thus, the use of the expression "Belleville" herein is not to be understood as limiting the invention to plain frusto-conical washers. And in the preferred employment of my invention, such springs 38 are under such preloaded condition as to assure operation at all times in the negative-rate portion of their respective coefficients.

Figure 10:
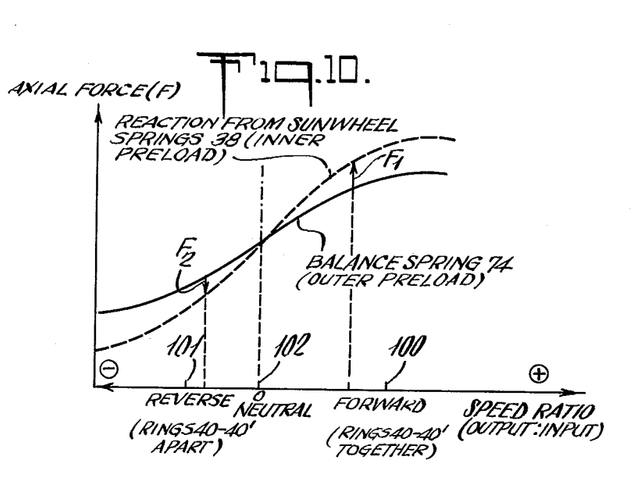
FIG. 10 is a graph to depict spring characteristics in use in the mechanism of FIG. 1.

FIG. 10 is a simplified illustration of the use of the outer preloaded balance spring means 74, in offsetting relation to the preloaded force reaction from the sun-wheel spring means 38. The solid-line curve will be seen to represent the characteristic of balance spring 74, with axial force plotted in terms of increasing speed ratio, forward being taken as positive. The selected usable range of spring means 38 is taken over the negative-rate portion of the curve, between limits 100–101 of "Forward" and "Reverse" transmission, i.e., speed of output shaft 11 in relation to speed of input shaft 10; this speed ratio will be zero for the "Neutral" condition 102. Parenthetic legends indicate that for greater speed ratios in the forward direction, rings 40–40' are squeezed more together (spring 74 being less compressed), and that for reduced speed ratios including reverse, rings 40–40' are displaced more apart from each other (spring 74 being more compressed), all in accordance with shift yoke positions suggested by legend in FIG. 5. Thus, over the range 101–100 depicted in FIG. 10, rings 40–40', most separated at 101, are brought more together in the course of shifting through "neutral"; throughout this direction of shifting through the range 101–100, spring 74 is progressively expanded or decompressed, but in view of its negative-rate operation in this range, the preload force of spring 74 increases. By the same token, shifting displacements which move rings 40–40' more apart are accompanied by decreasing preload force of spring 74.

For an assumed condition in which "Neutral" is the desired equilibrium (i.e., shift rod 12 in its "Neutral" position, and moderate to no load-torque reaction at 22), the reaction characteristic from the preloaded sun-wheel springs 38 (see dashed-line curve) is manifested as a spreading-displacement force between reaction rings 40–40', i.e., counterclockwise reaction moment on yoke 62 in the sense of FIGS. 5 and 6, and is seen to have been selected so as to cross or balance the solid-line curve at the "Neutral" point 102. With any shiftrod (12) displacement from neutral and in the forward direction, a directional difference force $F_1$ develops between the inner and outer spring systems (system 38 prevailing); the outer-ring squeezing which was accompanied by development of this force $F_1$ institutes a radially inward displacment of the planet rollers 27 and a spreading of sun wheels 35–35' (with accompanying change in output speed ratio). And because of the indicated negative-rate nature of all spring systems, the requisite planet-wheel displacement response is quickly achieved with only mildly increased resistance. For shift-rod displacement from "neutral"; and in the "reverse" direction, a similar but oppositely-poled mild difference force $F_2$ develops (system 74 prevailing), to quickly accomodate the radially outwardly urged displacement of the planet rollers 27 (due to accompanying axially approaching displacement of sun wheels 35–35'). Thus, for any speed selection at 12, the maximum reaction forces $F_1$, $F_2$ are of relatively small magnitude but are nevertheless of such polarity as to aid in returning the mechanism to "neutral" position, subject of course to the dragging resistance involved in restoring control rod 12 to its "neutral" position.

For many applications, the mechanism as described will be perfectly satisfactory, but FIG. 5 additionally illustrates a feature to provide stronger resilient force to urge the shift yoke 62 and its follower 64 away from extreme displacement positions. For such action, a slide bracket 98 has pierced upturned ends for keyed longitudinal sliding motion along a square-section guide rod 98', the latter being fixed in housing 13. Bracket 98 also has forked projections, constantly tracking the longitudinal position of a part of shift yoke 62, as the latter is caused to pivot about means 63; and a compression spring 99 on rod 98' is preloaded between locating pins 99' through rod 98'. As yoke 62 is shifted to the right (forward speed selection), the left end of slide 98 will further compress spring 99, thus relieving spring 99 from the left-end retaining pin 99' (as shown for the instant depicted in FIG. 5), with the result that spring 99 will tend to return yoke 62 to the neutral or to a less-than-full forward speed position; the same action occurs for reverse speed selection, with the right end of bracket 98 further compressing spring 99, thus causing spring 99 to tent to return yoke 62 to a more central position.

OPERATION OF AN ILLUSTRATIVE TRANSMISSION

For an illustrative embodiments wherein a 20 H.P. engine is to drive the shaft 10 for a range of FIG. 10 speed ratios and in which the limits 100 and 101 are respectively in the order of +0.4:1 and −0.15:1, I have successfully employed a 2:1 planetary gear ratio wherein sun and ring gears 41–46 are of 28 teeth and 56 teeth, respectively, and wherein three 13-tooth planet gears 28 orbit on a 3.6-inch diameter circle. At the same time, the traction-roller planetary system has used planetary rollers 27 in which the curvature radius of the concave rolling surface is 1.385 inches, a 40° arc of this radius being used to generate each concave surface of revolution, wherein the center for the curvature radius is taken at 1.58-inch offset from the roller axis; to coact with this planet-roll structure, each sun wheel and each reaction wheel has a convex rolling-surface curvature of 1.066-inch radius, a 40° arc of this radius being at 1-inch offset from the sun-wheel axis, and a 20° arc of this radius being at 3.63-inch offset from the reaction-ring axis, to generate the respective convex surfaces of revolution. The parts are run in a friction oil, an acceptable product being the Monsanto Co. synthetic hydrocarbon traction fluid commercially known as SANTO-TRAC-50.

In the "neutral" setting of the shift yoke 62, and for the indicated specific embodiment the effective radius of the orbiting circle of planet rollers 27 is such that the carrier 25 rotates at approximately one third of the speed of input shaft 10, and in the same direction as the input shaft. For "Forward" output speeds (at shaft 11), carrier 25 rotates at more than one third the speed of the input shaft, for example up to approximately two thirds of input shaft speed; for "reverse" output speeds, carrier 25 rotates at less than one third the speed of the input shaft, for example down to approximately one fourth of input shaft speed. In every case, it is the effective instantaneous radius of the orbiting circle of the planet rolls which determines such carrier rotation, and it is the current pivoted orientation of yoke 62 which determines the effective orbit-circle radius. For forward drive of a load, there will be a first direction of counter-rotational torque sustained by housing 13 via springs 81 and the outer-ring squeezing assembly (lower part of FIG. 6); for reverse drive of a load, there is a similar counter-rotational torque but in the opposite direction. And cam-follower roll 64 will be displaced according ot the directional magnitude of such load-induced torque reactions, once a predetermined magnitude of load-reaction torque develops beyond the threshold moment established by preloading of springs 81.

Figure 11:
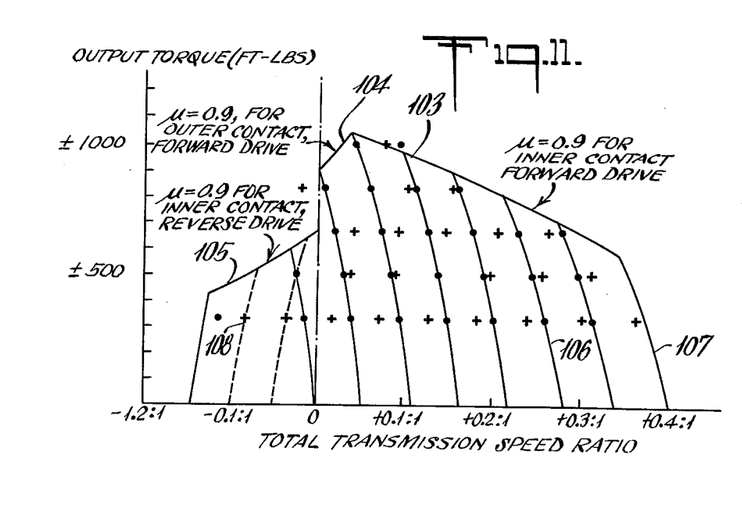
FIG. 11 is a graph to depict performance characteristics of the transmission of FIG. 1.

The foregoing will perhaps have greater meaning in the context of FIG. 11, which depicts output torque (at shaft 11) as a function of the net or total transmission speed ratio of the traction drive. FIG. 11 is drawn for the above-mentioned speed-selection range, namely, from −0.15:1 to +0.4:1, and a family of response curves is shown for each of seven illustrative control-rod (12) selected positions for forward drive, and for each of three such positions for reverse drive. The limits of operating range are closed, in the forward-drive regime, by a first sloping line 103 for which a limiting coefficient of traction ($\mu$) is taken as 0.9 for sun-to-planet rolling contact (i.e., not degraded by gross-skid) and by a second sloping line 104 for the same limiting coefficient in the context of planet-to-reaction ring contact; in the limited reverse-drive regime under consideration, only the sun-to-planet rolling contact is limiting for $\mu$ =0.9, the same being shown at line 105.

At the zero speed selection, and below the threshold load-torque reaction moment of springs 81, rod 12 will be understood to have centrally positioned cam 61, with the frame-referenced follower pin 97 at the region between legs A–B of cam 95, and with the yoke-follower roll 64 centered in the central zone C of cam 65. In FIG. 7, the centers of these followers with respect to their cams are identified at 97'–60, respectively.

For a forward-drive selection, say with rod 12 pushed to approximately 70 percent of its possible forward-selecting displacement, follower pin 97 has reacted with leg A of cam 95 (a) to impart clockwise displacement to plate 61 (about pin 92, in the sense of FIG. 7), (b) to place follower 64 near the juncture of the C and E zones of cam 65, and (c) to shift yoke response follows 62 to a "FORWARD" position, as suggested by legend in FIG. 5. Planet rollers 27 are thus forced to orbit at a lesser-radius circle, representing an axially spread repositioning of sun wheels 35-35' against the preload of springs 38, for the particular selected forward drive. This orbit circle may reduce slightly with increasing load-torque reaction, due to slight torque-induced "creep" or contact slippage via the traction fluid, so that the torque versus speed response follows a smooth curve 106 (for the assummed speed selection); achievement of the predetermined, $\mu$-related, design limit 103 occurs when load-torque reaction equals the combined effective preload moment of springs 81. Torques exceeding this preload at 81 are thus operative to impart partial rotation to follower roll 64 (about the axis of shafts 10-11, causing the same to enter leg E of cam 96, and thus to incrementally spread (or "downshift") the axial separation of reaction rings 40-40'. The net effect is to cause the drive to follow curve 103 for all elevated reaction torques above the intercept of curve 106 therewith.

Similar discussion can be provided for any forward-speed being shown by the curve 107, for which the indicated $\mu$-limited torque is reached at a substantially lower output-torque level than for the case of the 70-percent selected-speed curve 106.

For reverse-drive conditions, rod 12 is pulled back, past the "neutral" setting, with fixed follower 97 entering leg B of cam 95, to impart a counterclockwise pivoted displacement to the cam plate 61, thus placing yoke follower 64 at the juncture of parts C–D of cam 96. For any given reverse-speed setting of rod 12, output torque versus speed ratio will follow a smooth curve, as represented by the dashed-line relationship 108, until load-torque reaction approaches the preloaded moment of springs 81; thereafter, increased load torque further compresses springs 81, causing a "downshifting" entry of follower roll 64 in the D leg of cam 96.

CONCLUSION

The described traction drive will be seen to have achieved all stated objects with compact and efficient use of relatively simple parts, i.e., parts which are inherently capable of mass production on conventional work-rotating or tool-rotating machines. Automatic downshifting is achieved for load-reaction torques which exceed the predetermined $\mu$ limit (% of gross skid condition) of the parts most severely taxed by traction forces, all without impairing the ability of the mechanism to deliver steadily increasing output torque for progressively downshifted ratios; in all cases, the magnitude of spring preload at 81 establishes the desired $\mu$-limited condition.

The described range of speed-ratio selection will be understood to be illustrative, in that "neutral" is a function of the effective planet-orbit radius relation in the respective roller and gear planetary systems. For example, a greater range of reverse-drive ratios at the expense of a lesser range of forward-drive ratios, or a greater range of forward-drive ratios at the expense of a lesser range of reverse-drive ratios, will be understood to be available even for the case of the present 2:1 planetary-gear system, merely by suitable modification of the sun-to-reaction ring radius relation, for a given planet-roller size and contour.

Adjustment and maintenance are simplified in that the captive load reaction springs 81 are part of the outer-ring subassembly of FIG. 6, bodily removable for calibration, along with the preload setting of tie rods 76, prior to inserted assembly to housing 13. In this connection, it is noted that the outer or reaction rings effectively float with respect to the housing, in that the indicated subassembly relies for its support upon the frame-journaled support of the drive shaft 10. The desirable consequence of such floating of the outer reaction rings 40–40' will be seen as (a) contributing to smooth running and long life of the mechanism and (b) to material reduction in tolerances between these rings and the housing.

Figure 8:
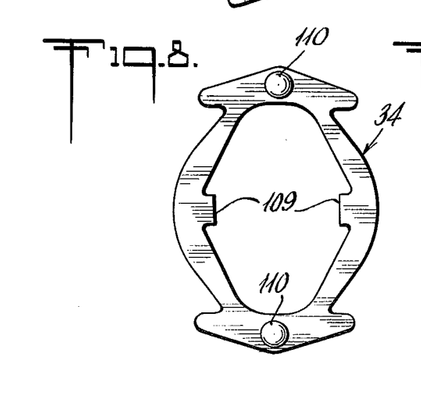
FIGS. 8 and 9, respectively, are plan and side views of an internal coupling element in the mechanism of FIG. 1.
Figure 9:
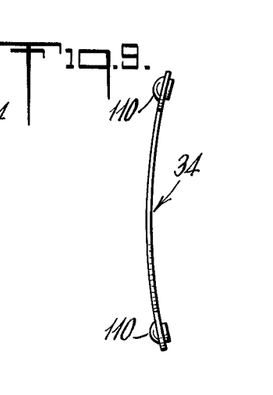

The use of three planetary rolls assures stabilized response to preloaded inner and outer ring contact of all planet rolls at all times, and the flexible sun-wheel sleeve-keying system (see FIGS. 1, 8 and 9) assures that torque application to the sun wheels 35-35' cannot disturb the ability of all planet rolls 27 to share the preload of spring system 38, whatever the instantaneous angular orientation of yoke 62. In FIGS. 8 and 9, the flexible key 34 is shown with inner sleeve-engaging keys 109 in quadrature relation with outer sun-wheel engaging lugs or coupling rivets 110, for maximum torque-transmitting use of hoop stresses in the body of key 34. Preferably, in its free and unstressed state, key 34 is arched as shown in FIG. 9, so that lug 110 entry in sun-wheel recesses 34' will be axially preloaded at all times; also preferably, recesses 34' are radially enlongate and large (compared to the size of the rivet portions engaged therein), thus enabling ready accommodation of any instantaneous misalignment of the sun wheels with respect to shaft 19 or sleeve 36.

Aside from the foregoing, the rolling-action planetary portion of my drive mechanism will be seen to have further advantages, in that the spring loading (system 38 versus sytem 74) may be designed with inherent tendency to return the parts to neutral, and friction in the mechanism and in external control parts (as for example in the linkage, Bowden cable, or the like actuation means, not shown, for selectively positioning rod 12) does not have to be very substantial in order to have rod 12 retain a selected speed positioning. And, as indicated, if desired, spring 99 and slide bracket 98 represent simple structure to avoid retention of an extreme speed setting.

While the invention has been described in detail for the preferred forms shown, it will be understood that modification may be made without departure from the scope of the invention.

What is claimed is:

1. A transmission comprising a housing, a drive shaft and a driven shaft journaled for rotation in said housing on a common axis, a variable-ratio coupling mechanism coupling said shafts, said mechanism including reaction means having antirotational support in said housing, torsionally resilient means providing such support, whereby in reaction to increasing torsional load said mechanism will be displaced in rotation about said axis and against increasing torsional resistance by said resilient means, said mechanism further including a control member for changing the coupling ratio between said input and output shafts, and cam-operated means reacting to such displacement and including means for modifying the instantaneous control condition of said control member.

2. The transmission of claim 1, in which the directional sense of modifying the stated instantaneous control condition is to effectively "downshift" the coupling ratio in the presence of increasing load torque.

3. The transmission of claim 2, in which said resilient means is preloaded to a predetermined threshold level, whereby downshifting control will not be commenced until torsional load has effectively achieved the preload threshold.

4. A transmission comprising a housing, a drive shaft and a driven shaft journaled for rotation in said housing on a common axis, a variable-ratio coupling mechanism coupling said shafts, said mechanism including reaction means having antirotational support in said housing, torsionally resilient means providing such support, whereby in reaction to increasing torsional load said mechanism will be displaced in rotation about said axis and against increasing torsional resistance by said resilient means, said mechanism further including a control member for changing the coupling ratio between said input and output shafts, selectively operable shift means connected to selectively position said control member, and cam-operated means reacting to such displacement and including means for modifying the instantaneous control condition of said control member for any given selected operation of said shift means.

5. A traction-drive transmission, comprising a housing, a drive shaft journaled for rotation in said housing, two spaced sun wheels having keyed longitudinally relatively slidable support on said shaft, a sun gear keyed to said shaft, Belleville-washer means carried by said shaft and axially preloading said sun wheels in the direction of relative axial approach to each other, plural like planet wheels axially interposed between and in rolling contact with said sun wheels, a planet-member carrier supported for rotation about the shaft axis and including spaced radial guides positioning said planet wheels on angularly spaced axes offset from the shaft axis and in said planet-member carrier, whereby each of said planet wheels may have at least a degree of generally radial freedom at its guided angular position with respect to said carrier, planet gears carried by said planet-member carrier and meshing with said sun gear on angularly spaced axes offset from the shaft axis, two spaced axially movable reaction rings having antirotational support in said housing and in constant rolling contact with said planet wheels, externally accessible control means including differentially operative separate axial-displacement connections to the respective reaction rings, an output shaft journaled for rotation in said housing on the alignment axis of said drive shaft, and a ring gear carried by said output shaft and meshing with said planet gears; said antirotational support comprising torsionally resilient means connecting said reaction rings to said housing, whereby in reaction to increasing torsional load said reaction rings will be angularly displaced against increasing torsional resistance by said resilient means, and cam-operated means reacting to such angular displacement and including means for modifying the instantaneous control condition of said control means.

6. The transmission of claim 5, in which the rolling-contact surfaces of said sun wheels and of said reaction rings are truncated-toroidal and convex, the sun-wheel truncations being selected to slope said sun-wheel surfaces in generally axially-facing and radially outward orientation, and the reaction-ring truncations being selected to slope the reaction-ring surfaces in generally axially-facing and radially inward orientation.

7. The transmission of claim 6, in which each of said planet wheels is a single rigid element characterized by two like rolling-contact surfaces which are truncated-toroidal and concave, the planet-wheel truncations being selected to slope said planet-wheel surfaces in generally axially-opposite and radially outward orientation.

8. The transmission of claim 7, in which each of said truncated surfaces is substantially the surface of revolution of a circular arc, the arc-curvature radius of the concave surfaces exceeding the arc-curvature radii of the convex surfaces.

9. The transmission of claim 8, in which the arc-curvature radii of the sun-wheel surfaces and of the reaction-ring surfaces are substantially the same.

10. The transmission of claim 8, in which the arc-curvature radii of the concave surfaces are approximately 1.3 times the magnitude of arc-curvature of the convex surfaces.

11. The transmission of claim 5, in which said Belleville-washer means is preloaded to place the same in the negative region of its spring-rate characteristic.

12. The transmission of claim 5, in which second Belleville-washer means in association with said reaction rings is preloaded in the direction urging said rings together.

13. The transmission of claim 12, said second Belleville-washer means is preloaded to place the same in the negative region of its spring-rate characteristic.

14. A traction-drive transmission, comprising a housing, a drive shaft journaled for rotation in said housing, two spaced sun wheels having keyed longitudinally relatively slidable support on said shaft, a sun gear keyed to said shaft, first Belleville-washer means carried by said shaft and axially preloading said sun wheels in the direction of relative axial approach to each other, plural like planet wheels axially interposed between and in rolling contact with said sun wheels, a planet-member carrier supported for rotation about the shaft axis and including spaced radial guides positioning said planet wheel on angularly spaced axes offset from the shaft axis and in said planet-member carrier, whereby each of said planet wheels may have at least a degree of generally radial freedom at its guided angular position with respect to said carrier, planet gears carried by said planet-member carrier and meshing with said sun gear on angularly spaced axes offset from the shaft axis, two axially movable reaction rings having antirotational support in said housing, second Belleville-washer means carried by said housing in such assembled relation with said reaction rings as to axially preload said reaction rings in axially compressive rolling contact with said planet wheels, selectively operable control means for directly determining the axial spacing of said reaction rings, an output shaft journaled for rotation in said housing on the alignment axis of said drive shaft, and a ring gear carried by said output shaft and meshing with said planet gears.

15. The transmission of claim 14, in which said first and second Belleville-washer means are preloaded to place each said Belleville-washer means in the negative region of its springrate characteristic.

16. The transmission of claim 14, in which selectively operable means are provided in association with one of said Belleville-washer means for varying the preloaded condition thereof.

17. The transmission according to claim 16, in which the characteristics of said first and second Belleville-washer means are selected to be effectively equal and opposite.

18. The transmission of claim 17, in which said Belleville-washer means are selected for the balanced condition wherein, for the degree of their preload condition and for the size ratios of said rolling-contact surfaces in relation to the size ratios and said meshing gears, substantially zero speed of said output shaft is achieved for an equilibrium radial positioning of said planet wheels, in reaction to Belleville-washer preloading.

19. A traction-drive transmission, comprising a housing, a drive shaft journaled for rotation in said housing, two spaced sun wheels having keyed longitudinally relatively slidable support on said shaft, a sun gear keyed to said shaft, Belleville-washer means carried by said shaft an axially preloading said sun wheels in the direction of relative axial approach to each other, plural like planet wheels axially interposed between and in rolling contact with said sun wheels, a planet-member carrier supported for rotation about the shaft axis and including spaced radial guides positioning said planet wheels on angularly spaced axis offset from the shaft axes and in said planet-member carrier, whereby each of said planet wheels may have at least a degree of generally radial freedom at its guided angular position with respect to said carrier, planet gears carried by said planet-member carrier and meshing with said sun gear on angularly spaced axis offset from the shaft axis, two axially movable reaction rings having antirotational support in said housing and in constant rolling contact with said planet wheels, an output shaft journaled for rotation in said housing on the alignment axis of said drive shaft, and a ring gear carried by said output shaft and meshing with said planet gears; selectively operable shift means for varying the relative axial spacing of said reaction rings, said shift means including a yoke having arms pivotally supported by said housing on opposite sides of the shaft axis, first control connections of one reaction ring to said arms at a first location of offset from the pivot axis, and second control connections of the other reaction ring to a second location of offset from the pivot axis, said first and second control connections being at opposite offsets from the pivot axis of said yoke.

20. The transmission of claim 19, in which said antirotational support comprises torsionally resilient means connecting said reaction rings to said housing, whereby in reaction to increasing load said reaction rings will be angularly displaced against increasing torsional resistance by said resilient means, and in which the pivotal yoke support includes for each yoke-arm pivot connection to said housing a circumferentially extending channel within said housing and of arcuate extent at least coextensive with the maximum extent of said angular displacement, each of said yoke arms carrying a pivot element tracking the housing channel.

21. The transmission of claim 20, in which each pivot element is a roller having rolling contact with a wall of the associated channel.

22. The transmission of claim 20, in which said antirotational support further comprises cam-operated means reacting to said load-responsive angular displacement and including a control connection to said yoke for changing the pivoted orientation of said yoke.

23. The transmission of claim 20, in which said shift means further includes a shift rod guided by said housing, and load-responsive means connecting said shift rod to said yoke, said load-responsive means being referenced to a part of said housing and determining different pivioted yoke orientations for a given shift rod position, all as a function of said load-responsive angular displacement.

24. The transmission of claim 23, in which said load-responsive means is cam-operated in response to such angular displacement.

25. A traction-drive transmission, comprising a housing, a drive shaft journaled for rotation in said housing, two spaced sun wheels having keyed longitudinally relatively slidable support on said shaft, a sun gear keyed to said shaft, Belleville-washer means carried by said shaft and axially preloading said sun wheels in the direction of relative axial approach to each other, plural like planet wheels axially interposed between and in rolling contact with said sun wheels, a planet-member carrier supported for rotation about the shaft axis and including spaced radial guides positioning said planet wheels on angularly spaced axes offset from the shaft axis and in said planet-member carrier, whereby each of said planet wheels may have at least a degree of generally radial freedom at its guided angular position with respect to said carrier, planet gears carried by said planet-member carrier and meshing with said sun gear on angularly spaced axes offset from the shaft axis, two axially movable reaction rings having antirotational support in said housing and in rolling contact with said planet wheels, control means for directly determining the instantaneous axial spacing of said reaction rings, an output shaft journaled for rotation in said housing on the alignment axis of said drive shaft, and a ring gear carried by said output shaft and meshing with said planet gears; said planet wheels and planet gears being each in a plurality of three and carried by said planet-member carrier at interlaced equal angular spacings.

26. The transmission of claim 25, in which each of said planet wheels is a single rigid element characterized by two like rolling-contact surfaces which are truncated-toroidal and concave, said rolling-contact surfaces being of like slopes which are of generally axially-opposite and radially outward orientation, each said wheel including rotary-support portions projecting axially beyond said rolling-contact surfaces, and said carrier including axially spaced radial guides for both rotary-support portions of each planet wheel at its particular angular location.

27. The transmission of claim 26, in which a slide guided by each radial guide includes bearing means for the one of the rotary-support portions of each planet wheel.

28. The transmission of claim 25, in which said reaction rings, said carrier, said planet wheels, said sun wheels and drive shaft are all parts of a single subassembly having primary reliance upon the journaled housing support of said drive shaft, whereby said reaction rings may effectively float with respect to said housing.

* * * * *